(12) United States Patent
Snyder

(10) Patent No.: US 10,180,082 B2
(45) Date of Patent: Jan. 15, 2019

(54) FAN CASE

(71) Applicant: Rolls-Royce Corporation, Indianapolis, IN (US)

(72) Inventor: Burke J. Snyder, Avon, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 890 days.

(21) Appl. No.: 14/701,124

(22) Filed: Apr. 30, 2015

(65) Prior Publication Data

US 2015/0354408 A1 Dec. 10, 2015

Related U.S. Application Data

(60) Provisional application No. 62/008,131, filed on Jun. 5, 2014.

(51) Int. Cl.
*F01D 25/24* (2006.01)
*F01D 21/04* (2006.01)

(52) U.S. Cl.
CPC ............ *F01D 25/24* (2013.01); *F01D 21/045* (2013.01); *F05D 2220/32* (2013.01); *F05D 2230/70* (2013.01); *F05D 2240/11* (2013.01); *Y02T 50/672* (2013.01); *Y10T 29/4932* (2015.01)

(58) Field of Classification Search
CPC .... F01D 25/24; F01D 21/045; F05D 2220/32; F05D 2230/70; F05D 2240/11
USPC .............................................................. 415/9
See application file for complete search history.

(56) References Cited

U.S. PATENT DOCUMENTS

| | | | |
|---|---|---|---|
| 3,970,318 A * | 7/1976 | Tuley | F01D 11/005 277/641 |
| 5,336,044 A * | 8/1994 | Forrester | F01D 21/045 415/196 |
| 5,486,086 A | 1/1996 | Bellia et al. | |
| 6,217,277 B1 | 4/2001 | Liu et al. | |
| 6,261,053 B1 * | 7/2001 | Anderson | F01D 5/08 415/115 |
| 6,270,311 B1 * | 8/2001 | Kuwabara | F01D 11/005 415/110 |
| 6,364,603 B1 | 4/2002 | Czachor et al. | |
| 8,016,543 B2 | 9/2011 | Braley et al. | |
| 8,202,041 B2 | 6/2012 | Wojtyczka et al. | |
| 8,267,642 B2 | 9/2012 | Binks et al. | |
| 8,333,558 B2 | 12/2012 | Finn et al. | |
| 8,438,857 B2 | 5/2013 | Shutrump | |

(Continued)

FOREIGN PATENT DOCUMENTS

| | | |
|---|---|---|
| EP | 1519010 A1 | 3/2005 |
| GB | 2356022 A | 5/2001 |

OTHER PUBLICATIONS

European Office Action, European Application No. 15166674.0-1610, dated Jun. 14, 2017, 4 pages.

(Continued)

*Primary Examiner* — Aaron R Eastman
(74) *Attorney, Agent, or Firm* — Barnes & Thornburg LLP

(57) ABSTRACT

A fan case for use in a gas turbine engine of an aircraft includes an outer shroud and a liner extending along the outer shroud. The fan case provides a protective band that blocks fan blades from being thrown out of the fan case in case of a blade-off event in which a fan blade is released during operation of the gas turbine engine.

20 Claims, 7 Drawing Sheets

(56) References Cited

U.S. PATENT DOCUMENTS

2005/0067788 A1* 3/2005 Liang .................. F01D 11/005
                                                    277/409
2010/0320316 A1    12/2010 Vauchel et al.
2011/0070079 A1    3/2011  Vest
2012/0082541 A1    4/2012  Macchia et al.

OTHER PUBLICATIONS

European Office Action for Application No. 15166674.0-1610, dated Jun. 14, 2017, 4 pages.
Extended European Search Report, European Application No. 15166674.0-1610, search completed Oct. 19, 2015, 8 pages.

* cited by examiner

FAN CASE

CROSS REFERENCE TO RELATED APPLICATIONS

This application claims priority to and the benefit of U.S. Provisional Patent Application No. 62/008,131, filed 5 Jun. 2014, the disclosure of which is now expressly incorporated herein by reference.

FIELD OF THE DISCLOSURE

The present disclosure relates generally to gas turbine engines and more specifically to fan containment cases for gas turbine engines.

BACKGROUND

Gas turbine engines used in aircraft often include a fan assembly that is driven by an engine core to push air through the engine and provide thrust for the aircraft. A typical fan assembly includes a fan rotor having blades and a fan case that extends around the blades of the fan rotor. During operation, the fan blades of the fan rotor are rotated to push air through the engine. The fan case both guides the air pushed by the fan blades and provides a protective band that blocks fan blades from being thrown out of the fan assembly in case of a blade-off event in which a fan blade is released from the fan rotor.

Fan cases sometimes include metallic shrouds and liners positioned between the metallic shroud and the fan blades. Liners are generally used to achieve a desired dimensional tolerance between the fan blades and the fan case. The distance between the fan blades and the fan case may vary due to variations in dimensional tolerances or thermo-mechanical deflections. As such, liners may include an abraidable layer that the fan blades may contact without damaging the shroud. Liners may be coupled to metallic shrouds by hanger features that extend from the metallic shrouds or by adhesives that provide a permanent bond to the metallic shrouds. Over time, the liners may need to be repaired or replaced.

SUMMARY

The present disclosure may comprise one or more of the following features and combinations thereof.

A fan case may include an annular outer shroud and a liner segment. The annular outer shroud may be arranged to extend around a central axis of the fan case. The annular outer shroud may have an outer surface facing away from the central axis and an inner surface facing toward the central axis. The liner segment may be coupled to the inner surface of the annular outer shroud. The liner segment may include an inner radial surface, an outer radial surface spaced apart radially from the inner radial surface, and a head surface extending between and interconnecting the inner and outer radial surfaces. The head surface may intersect a first ray extending from the central axis to the annular outer shroud.

In some embodiments, the head surface may be curved. In some embodiments, the head surface may be linear and an acute angle $\alpha$ may be defined between the head surface and the first ray. The acute angle $\alpha$ may be between about 10 degrees and about 30 degrees. In some embodiments, the acute angle $\alpha$ may be about 20 degrees.

In some embodiments, the head surface may include a first sub-surface and a second sub-surface. The first sub-surface may extend from the inner radial surface toward the outer radial surface. The second sub-surface may extend from the outer radial surface toward the inner radial surface and connected to the first sub-surface.

In some embodiments, the first sub-surface may be linear. An acute angle $\alpha$ may be defined between the first sub-surface and the first ray. The acute angle $\alpha$ may be between about 10 degrees and about 30 degrees. In some embodiments, the acute angle $\alpha$ may be about 20 degrees.

In some embodiments, the second sub-surface may be linear. An acute angle $\beta$ may be defined between the second sub-surface and the first ray. The acute angle $\beta$ may be between about 10 degrees and about 30 degrees. In some embodiments, the acute angle $\beta$ may be different than the acute angle $\alpha$.

According to another aspect of the present disclosure, a fan case may include an annular shroud, a first liner segment, and a second liner segment. The annular outer shroud may be arranged to extend around a central axis of the fan case. The annular outer shroud may have an outer surface facing away from the central axis and an inner surface facing toward the central axis.

The first liner segment may have an outer radial surface and an inner radial surface. The outer radial surface may be coupled to the inner surface of the annular outer shroud. The inner radial surface may be radially spaced apart from the outer radial surface. The inner radial surface may be positioned at a first radius from the central axis. The first liner segment may include a body, a head coupled to the body and extending toward a second liner segment, and a tail coupled to the body and extending away from the body.

The second liner segment may have an outer radial surface and an inner radial surface. The outer radial surface may be coupled to the inner surface of the annular outer shroud. The inner radial surface may be radially spaced apart from the outer radial surface. The inner radial surface may be positioned at a first radius from the central axis. The second liner segment may include a body, a tail coupled to the body and extending toward the first liner segment, and a head coupled to the body and extending away from the first liner segment.

Movement of the first liner segment in a radially outward direction may cause the head of the first liner segment to engage the tail of the second liner segment. As a result, the second liner segment may move with the first liner segment to cause the inner surface of the first liner segment to be positioned at a second radius from the central axis and the inner surface of the second liner segment to be positioned at about the second radius from the central axis.

In some embodiments, the head of the first liner segment may include a head surface that intersects a first ray extending from the central axis to the annular outer shroud. In some embodiments, the tail of the second liner segment may include a tail surface that intersects a second ray extending from the central axis to the annular outer shroud.

In some embodiments, a first acute angle $\alpha$ may be defined between the head surface and the first ray and the first acute angle $\alpha$ may be between about 10 degrees and 30 degrees. In some embodiments, the first acute angle $\alpha$ may be about 20 degrees.

In some embodiments, a second acute angle $\theta$ may be defined between the tail surface and the second ray and the second acute angle $\theta$ may be between about 10 degrees and 30 degrees. In some embodiments, the second acute angle $\theta$ may be about 20 degrees.

In some embodiments, the head of the first liner segment may include a head surface that intersects a first ray extending from the central axis to the annular outer shroud. The tail of the second liner segment may include a tail surface that intersects the first ray.

According to another aspect of the present disclosure, a method of removing a liner segment from a fan case included in a gas turbine engine mounted to an aircraft is provided. The method may include providing a gas turbine engine mounted to an aircraft, the gas turbine engine including a fan case arranged to extend around a central axis and including an annular outer shroud and a liner segment coupled to the annular outer shroud to lie between the annular outer shroud and the central axis, uncoupling the liner segment from the annular outer shroud, and moving the liner segment radially inward along a path toward the central axis without moving the liner segment axially relative to the central axis.

In some embodiments, the path may be curved. In some embodiments, the gas turbine engine may further include a fan rotor extending along the central axis and a number of blades coupled to the fan rotor and extending radially outward from the central axis toward the liner segment. The liner segment may include a body, a head coupled to the body and including a head surface, and a tail coupled to the body and including a tail surface. The blades may rotate in a direction of travel from the tail to the head.

These and other features of the present disclosure will become more apparent from the following description of the illustrative embodiments.

DETAILED DESCRIPTION OF THE DRAWINGS

Figures 1, 2:
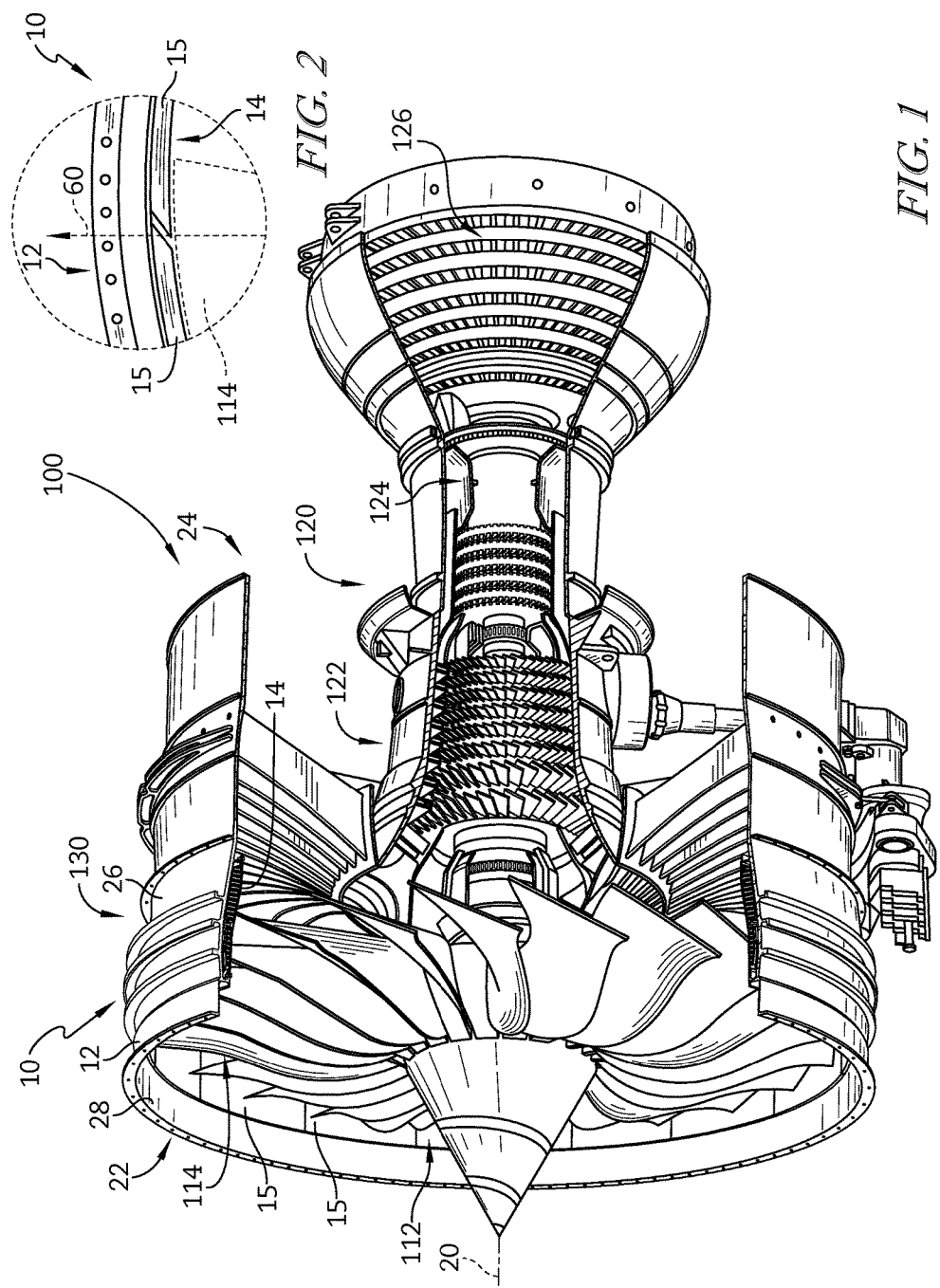
FIG. 1 is a perspective view of a gas turbine engine with portions broken away showing that the gas turbine engine includes a fan case that surrounds fan blades included in a fan rotor and showing that the fan case includes an annular outer shroud and a liner formed by a number of liner segments positioned between the fan blades and the annular outer shroud.
FIG. 2 is an enlarged view of the fan case of FIG. 1 showing that a head surface of each liner segment is spaced apart from a tail surface of an adjacent liner segment and the head surface is angled relative to a ray extending from a central rotation axis of the fan case.

For the purposes of promoting an understanding of the principles of the disclosure, reference will now be made to a number of illustrative embodiments illustrated in the drawings and specific language will be used to describe the same.

An illustrative gas turbine engine 100 used in aircraft includes a fan assembly 130 driven by an engine core 120 to push air through the engine 100 and provide thrust for the aircraft as suggested in FIG. 1. The illustrative fan assembly 130 includes a fan rotor 112 having a number of fan blades 114 and a fan case 10 that extends around the fan blades 114 of the fan rotor 112. The fan case 10 both guides the air pushed by the fan blades 114 and provides retention means for blocking the fan blades 114 from being thrown out of the fan assembly 130 in case of a blade-off event in which at least one of the fan blades 114 is released from the fan rotor 112 during operation of the gas turbine engine 100.

The fan case 10 extends around and along a central axis 20 between a front end 22 (sometimes called the front of the fan case 10) and a back end 24 (sometimes called the back of the fan case 10) as shown in FIG. 1. The fan case 10 illustratively includes an annular outer shroud 12 and a liner 14 as shown in FIGS. 1 and 2. The annular outer shroud 12 includes an inner surface 28 facing toward the central axis 20 and an outer surface 26 facing away from the central axis 20. The liner 14 is arranged along the inner surface 28 of the annular outer shroud 12 to reinforce the annular outer shroud 12. In the illustrative embodiment, the liner 14 is formed from a plurality of circumferentially-extending liner segments 15 that cooperate to define a full ring as shown in FIGS. 1 and 3.

Figure 3:
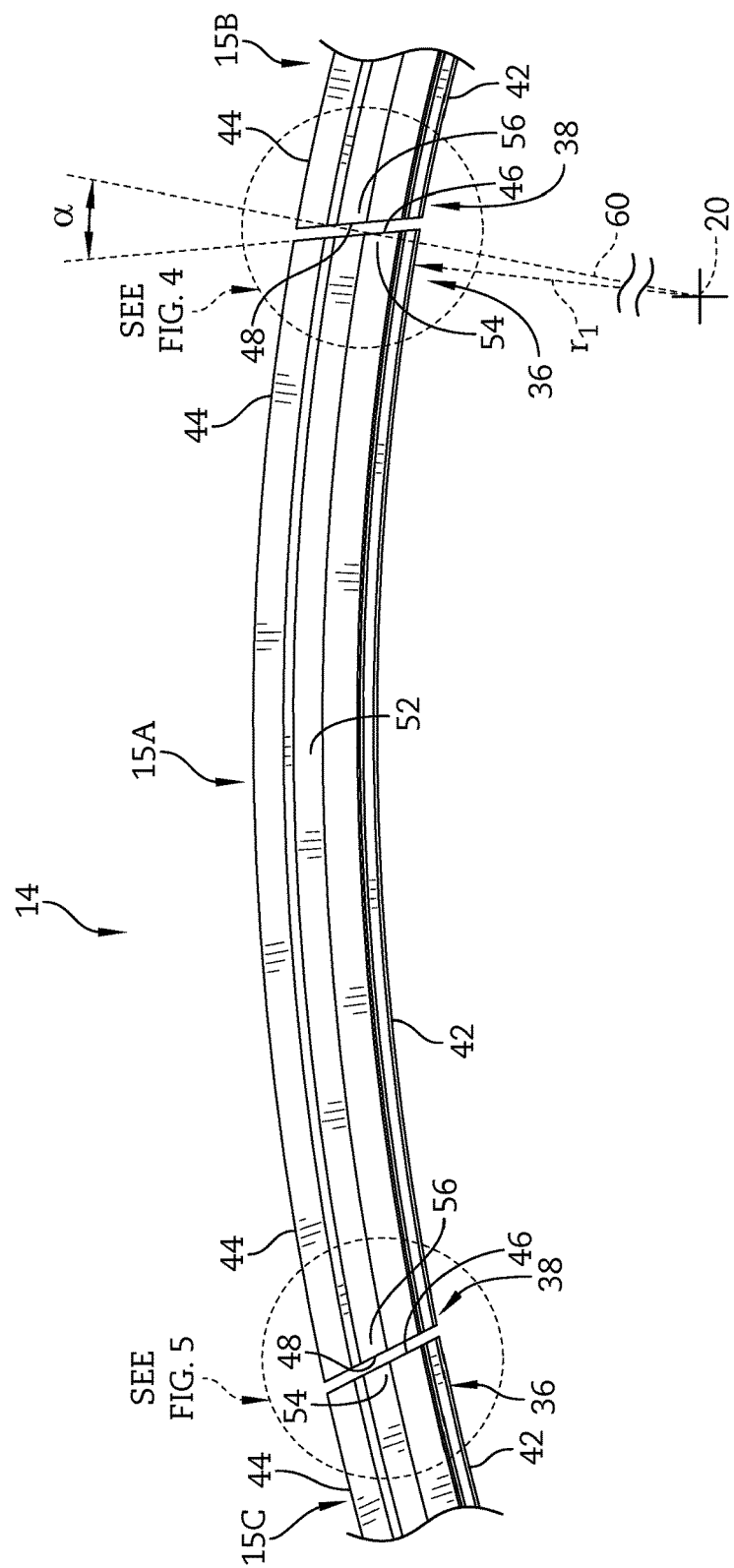
FIG. 3 is an elevation view of the liner segment of FIG. 2 showing that each liner segment includes a body, a head that extends from the body at a head end of the segment, and a tail that extends from the body at a tail end of the segment.

A first liner segment 15A includes an outer radial surface 44 coupled to the inner surface 28 of the annular outer shroud 12 and an inner radial surface 42 radially spaced apart from the outer radial surface 44 as shown in FIG. 3. The inner radial surface 42 is spaced apart from the central axis 20 by a first radius $r_1$. The first liner segment 15A includes a body 52, a head 54 that extends from the body 52 circumferentially toward a second segment 15B, and a tail 56 that extends circumferentially away from the second liner segment 15B from the body 52.

The second liner segment 15B is substantially the same as the first liner segment 15A, and thus, only the first liner segment 15A will be discussed in detail. During a blade-off event, at least one of the blades 114 applies a force $F_1$ to the first liner segment 15A in a radially outward direction away from the central axis 20 as suggested in FIGS. 7 and 8. The force $F_1$ causes the first liner segment 15A to move radially outward so that the head 54 of the first liner segment 15A engages the tail 56 of the second liner segment 15B to cause the second liner segment 15B to move therewith as suggested in FIGS. 7 and 8. As a result of the first and second liner segments 15A, 15B moving together, both inner surfaces 28 of the first and second liner segments 15A, 15B are moved to a second radius $r_2$ from the central axis 20 providing for a smooth transition between the liner segments 15A, 15B as the blade 114 moves around the central axis.

The fan assembly 130 is illustratively mounted to the turbine engine core 120 to be driven by the engine core 120 as shown, for example, in FIG. 1. The engine core 120 includes a compressor 122, a combustor 124, and a turbine 126. The compressor 122 is configured to compress and deliver air to the combustor 124. The combustor 124 is configured to mix fuel with the compressed air received from the compressor 122 and to ignite the fuel. The hot high pressure products of the combustion reaction in the combustor 124 are directed into the turbine 126 and the turbine 126 extracts work to drive the compressor 122 and the fan assembly 130.

The fan case 10 includes the annular outer shroud 12 and the liner 14 as shown in FIG. 1. The annular outer shroud 12 extends circumferentially around the central axis 20 of the engine 100 and extends axially between the front end 22 and the back end 24 of the fan case 10 to block a released blade from escaping the fan assembly 130. The liner 14 is arranged along the inner surface 28 of the annular outer shroud 12 to reinforce the annular outer shroud 12.

Figure 6:
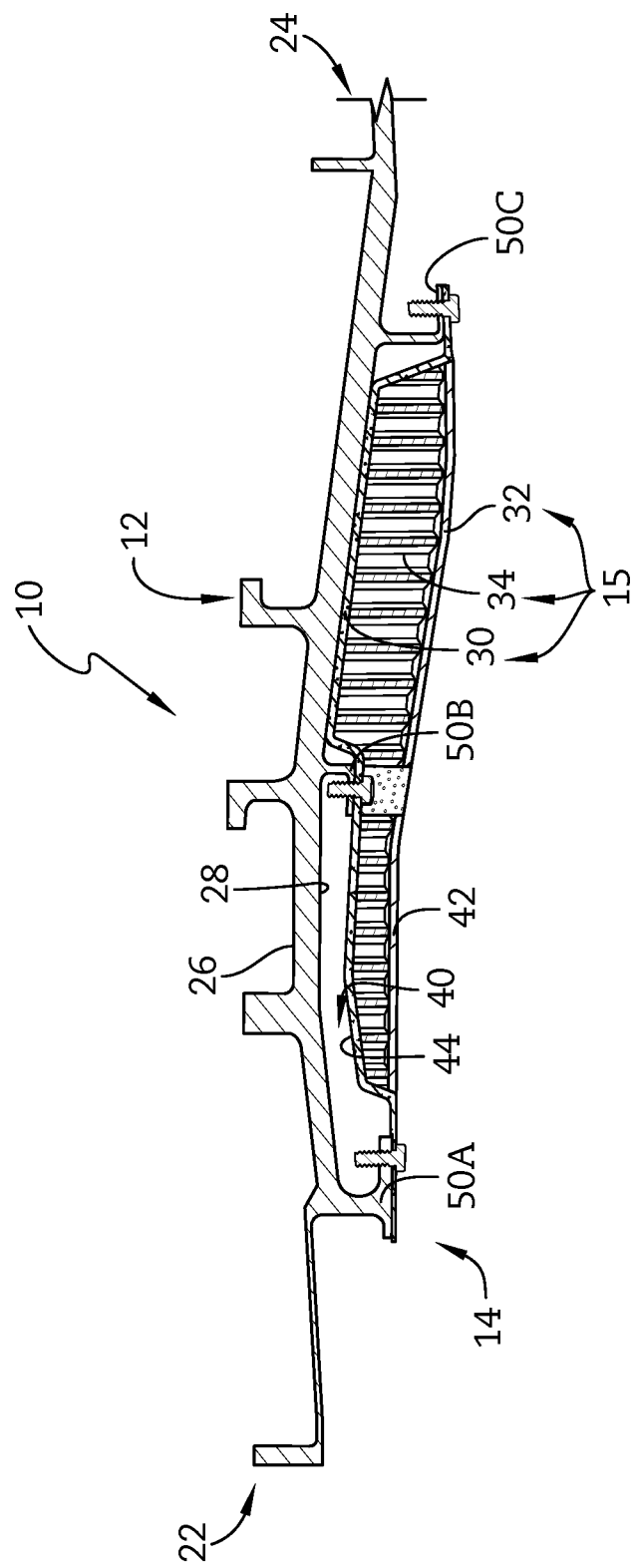
FIG. 6 is an enlarged cutaway view of the fan case of FIG. 1 showing the annular outer shroud and a liner segment of the fan case arranged along an inner surface of the annular outer shroud.

The annular outer shroud 12 is illustratively an integral full ring arranged around the fan blades 114 as shown in FIG. 1. The annular outer shroud 12 includes the outer surface 26 facing outward in a radial direction away from the central axis 20 and the inner surface 28 facing inward in the radial direction toward the central axis 20 as shown in FIGS. 1 and 6. In the illustrative embodiment, the annular outer shroud 12 is made from metal. In other embodiments, the annular outer shroud 12 is made from composite materials including a plurality of reinforcing fibers suspended in a matrix material.

In the illustrative embodiment, the liner 14 is formed from the plurality of circumferentially-extending liner segments 15 that cooperate to define a full ring as shown in FIGS. 1 and 3. Each liner segment 15 of the liner 14 is independently removable from the annular outer shroud 12 so that each liner segment 15 may be replaced without replacing one or more of the additional liner segments 15.

The plurality of liner segments 15 are arranged around the annular outer shroud 12 to form the liner 14 as shown in FIG. 1. Each liner segment 15 is spaced apart circumferentially from adjacent liner segments 15 as shown in FIG. 3. The liner segments 15 are arranged to engage one another and to move therewith when a fan blade 114 is released to minimize escape of the released blade 114 from escaping fan case 10.

A first liner segment 15A is positioned circumferentially between a second liner segment 15B and a third liner segment 15C as shown in FIG. 3. The first liner segment 15A includes the inner radial surface 42, the outer radial surface 44 spaced apart from the inner radial surface 42, a head surface 46, and a tail surface 48 spaced apart from the head surface 46. The first liner segment 15A extends circumferentially between the head surface 46 located at a head end 36 of the first liner segment 15A and the tail surface 48 located at a tail end 38 of the first liner segment 15A.

The inner radial surface 42 is spaced apart from the central axis 20 by a first radius $r_1$ as shown in FIG. 3. During operation, the first liner segment 15A may move in a radially outward direction in which the first liner segment 15A is spaced apart from the central axis 20 by a second radius $r_2$ as shown in FIG. 8. Movement of the first liner segment 15A, such as movement caused by a released fan blade 114 contacting the first liner segment 15A, for example, causes the first liner segment 15A to engage the second liner segment 15B. The engaged first and second liners 15A, 15B move together to cause the inner radial surface 42 of the second liner segment 15B to be spaced apart from the central axis 20 by about the second radius $r_2$ as suggested in FIGS. 7 and 8.

Figure 4:
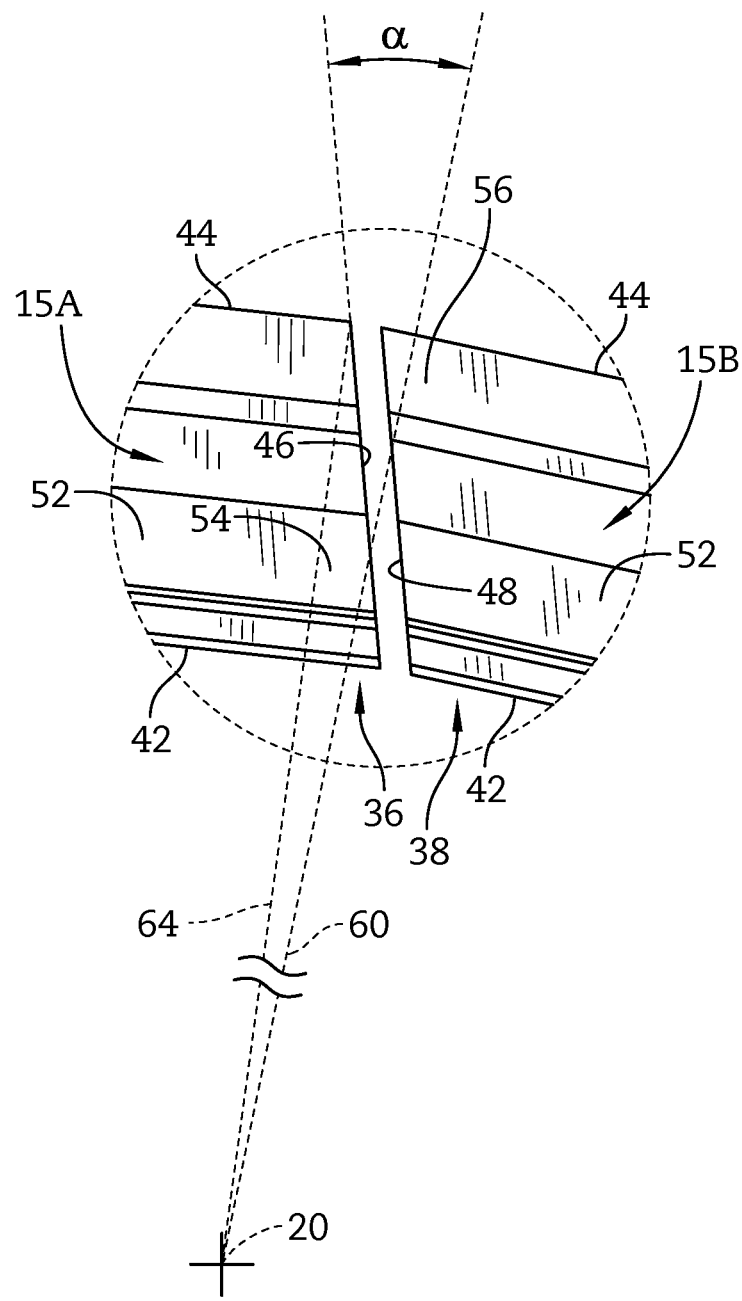
FIG. 4 is a detail view of the head of the liner segment of FIG. 3 showing that the head forms a head surface that intersects a ray extending from the central axis to the outer radial surface of the liner segment.
Figure 9:
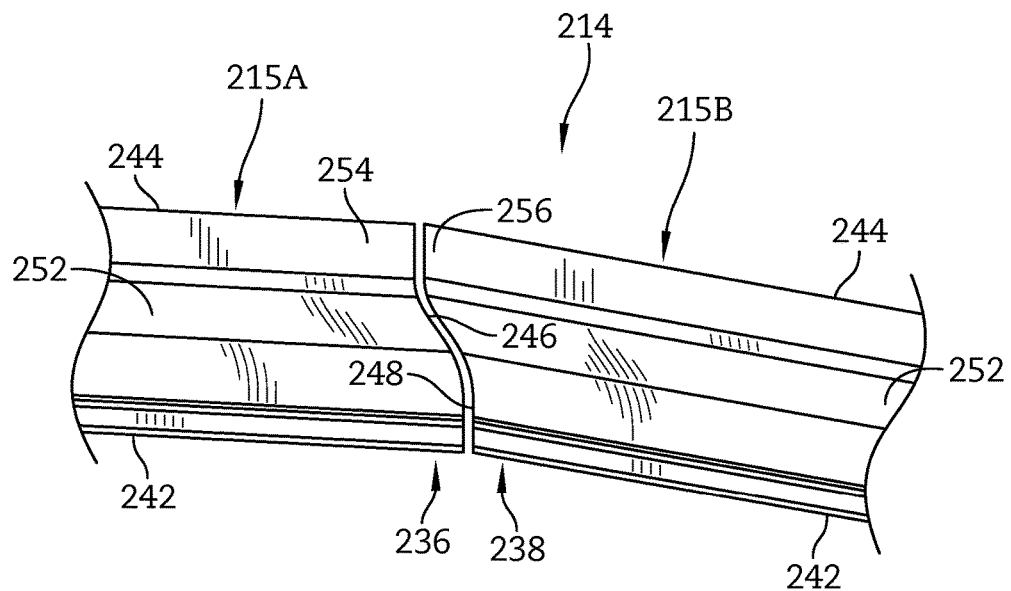
FIG. 9 is an elevation view of another embodiment of a liner in accordance with the present disclosure showing that a head of a first liner segment is curved and a corresponding tail of a second liner segment is curved.
Figure 10:
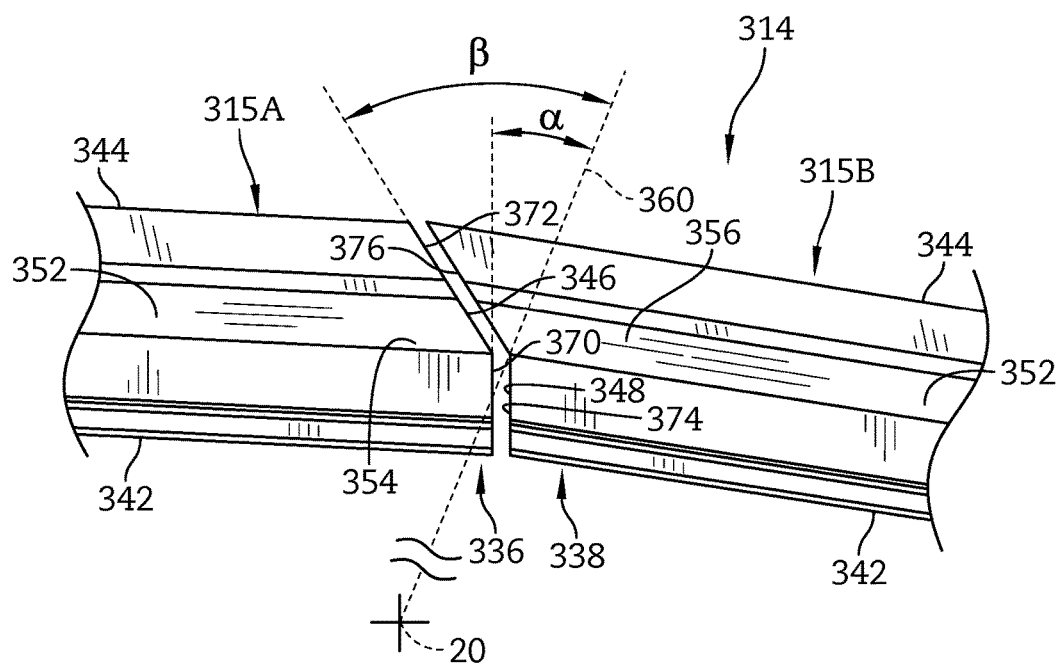
FIG. 10 is an elevation view of another embodiment of a liner in accordance with the present disclosure showing that a head of a first liner segment includes a first sub-surface and a second sub-surface and a tail of a second liner segment includes an associated first sub-surface and second sub-surface.

The head surface 46 extends between and interconnects the inner and outer radial surfaces 42, 44 at the head end 36 as shown in FIG. 4. The head surface 46 intersects a first ray 60 that extends from the central axis 20 toward the annular outer shroud 12. In an illustrative embodiment, the head surface 46 is linear as shown in FIGS. 3 and 4. An acute angle $\alpha$ is defined between the head surface 46 and the first ray 60. In some embodiments, the acute angle $\alpha$ is between about 10 degrees and about 30 degrees. In the illustrative embodiment, the acute angle $\alpha$ is about 20 degrees. In other embodiments, the head surface 46 is curved as shown in FIG. 9. In other embodiments, the head surface 46 includes a number of sub-surfaces as shown in FIG. 10.

Figure 5:
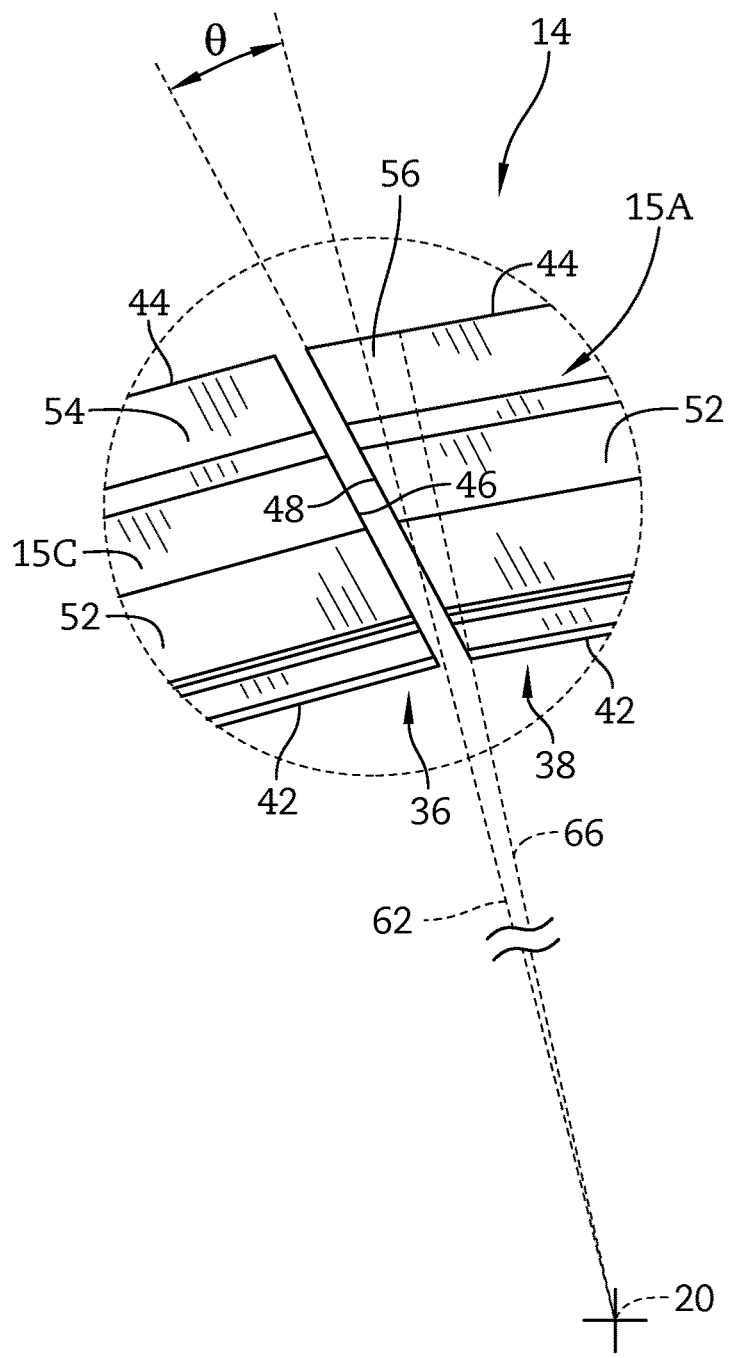
FIG. 5 is a detail view of the tail of the liner segment of FIG. 3 showing that the tail forms a tail surface that intersects a ray extending from the central axis to the outer radial surface of the liner segment.

The tail surface 48 extends between and interconnects the inner and outer radial surfaces 42, 44 at the tail end 38 as shown in FIG. 5. The tail surface 48 intersects a second ray 62 that extends from the central axis 20 toward the annular outer shroud 12 as shown in FIGS. 3 and 5. In an illustrative embodiment, the tail surface 48 is linear as shown in FIGS. 3 and 5. An acute angle $\theta$ is defined between the tail surface 48 and the second ray 62. In some embodiments, the acute angle $\theta$ is between about 10 degrees and about 30 degrees. In the illustrative embodiment, the acute angle $\theta$ is about 20 degrees. In other embodiments, the tail surface 48 includes a number of sub-surfaces. In other embodiments, the tail surface 48 is curved. In the illustrative embodiment, the acute angle $\alpha$ and the acute angle $\theta$ are the same. In other embodiments, the acute angle $\alpha$ and the acute angle $\theta$ are different. In the illustrative embodiment, the tail surface 48 of the second liner segment 15B intersects the first ray 60 that extends from the central axis 20 toward the annular outer shroud 12 as shown in FIG. 3.

The liner segment 15 is defined by a body 52, a head 54 coupled to the body 52 at the head end 36, and a tail 56 coupled to the body 52 at the tail end 38 as shown in FIGS. 3-5. The body 52 is arranged to couple the liner segment 15 to the annular outer shroud 12. The head 54 of the first liner segment 15A is arranged to engage the tail 56 of the second liner segment 15B to cause the second liner segment 15B to move therewith. The tail 56 of the first liner segment 15A is arranged to engage the head 54 of the third liner segment 15C to cause the first liner segment 15A to move therewith.

The body 52 is coupled to and reinforces the annular outer shroud 12 as shown in FIGS. 1 and 6. The body 52 extends axially between the front end 22 and the back end 24 of the fan case 10 to minimize escape of a released blade from the fan assembly 130. When the body 52 experiences a force in the outward direction such as, for example, when the body 52 is contacted by a released blade 114, the body 52 moves radially outward away from the central axis 20 relative to the second and third liner segments 15B, 15C.

The head 54 extends away from the body 52 toward the tail 56 of the second liner segment 15B as shown in FIGS. 3 and 4. A third ray 64 extends from the central axis 20 of the engine 100 to the outer radial surface 44 of the first liner segment 15A as shown in FIG. 4. The third ray 64 is located between the head 54 and the body 52 to define the head 54.

The head 54 includes the head surface 46 as shown in FIGS. 3 and 4. When a blade contacts the first liner segment 15A, the head 54 moves with the body 52 and the head surface 46 engages the tail surface 48 of the second liner segment 15B to cause the second liner segment 15B to move therewith.

The tail 56 extends away from the body 52 toward the head 54 of the third liner segment 15C as shown in FIGS. 3 and 5. A fourth ray 66 extends from the central axis 20 to the outer radial surface 44 of the first liner segment 15A as shown in FIG. 5. The fourth ray 66 is located between the tail 56 and the body 52 to define the tail 56. The tail 56 includes the tail surface 48. When a blade 114 contacts the first liner segment 15A, the tail 56 moves with the body 52.

Figure 7:
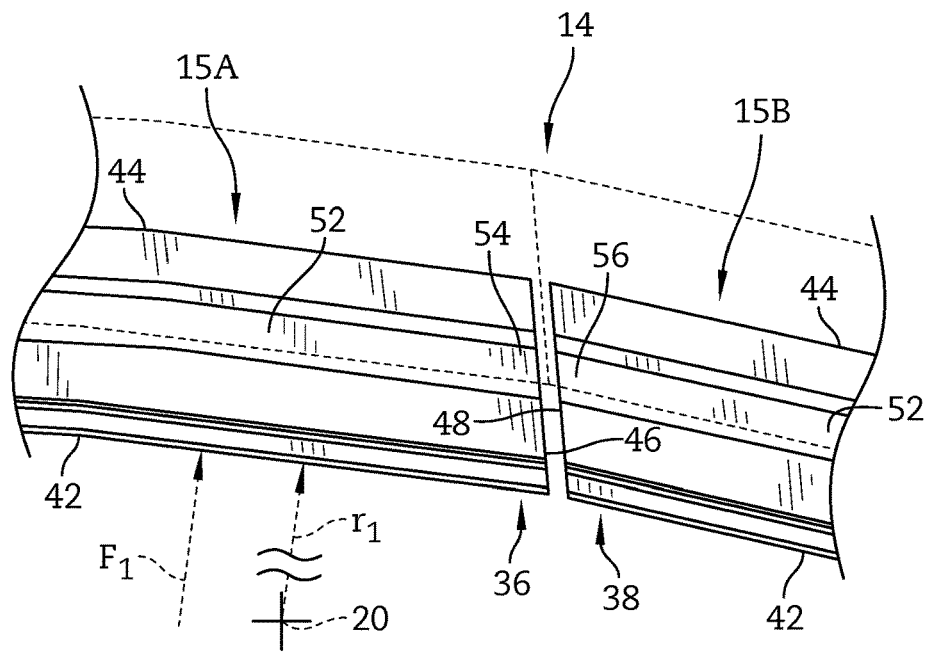
FIG. 7 is an elevation view of the first and second liner segments showing that the first liner segment is spaced apart circumferentially from the second liner segment before a radially outward force is applied to the first liner segment by a released fan blade which causes the first liner segment to move radially outward and engage the second liner segment as shown in FIG. 8.
Figure 8:
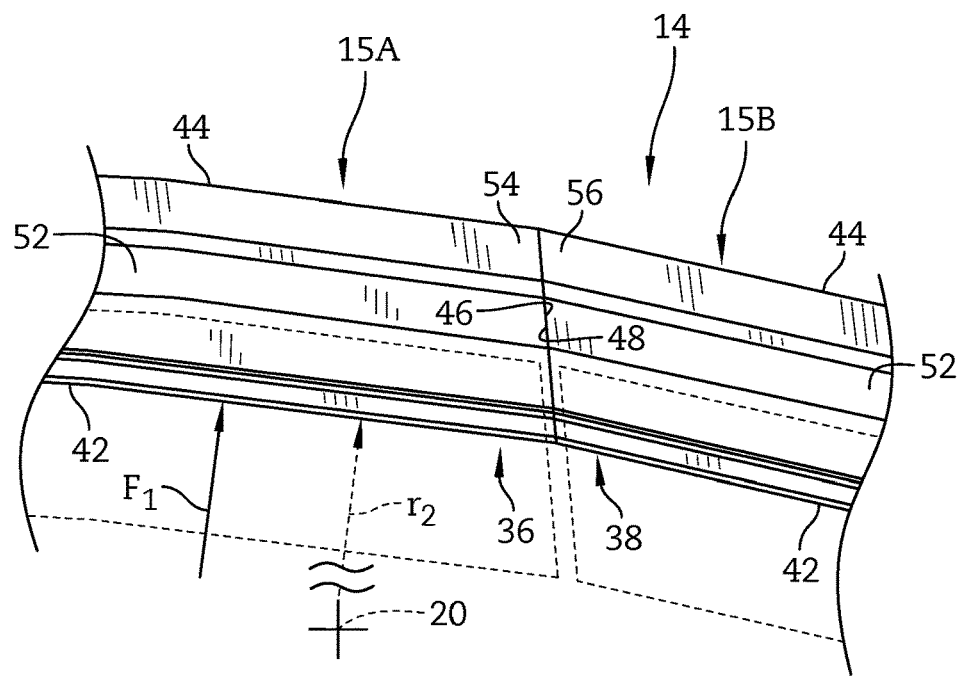
FIG. 8 is a view similar to FIG. 7 showing that the first liner segment has moved in a radially outward direction in response to application of the radially outward force and the head of the first liner segment has engaged the tail of the second liner segment to cause the second liner segment to move radially outward therewith.

In operation, the first liner segment 15A is spaced apart from the second liner segment 15B as shown in FIG. 7. The inner radial surfaces 42 of the first and second liner segments 15A, 15B are spaced apart from the central axis 20 by the first radius $r_1$. During a blade-off event, at least one of the blades 114 applies a force to the first liner segment 15A in a radially outward direction away from the central axis 20. The force $F_1$ causes the first liner segment 15A to move radially outward so that the head 54 of the first liner segment 15A engages the tail 56 of the second liner segment 15B to cause the second liner segment 15B to move therewith as shown in FIG. 8. The released blade 114 travels in a direction of rotation of the fan assembly 130. The direction of rotation is a circumferential direction from the tail end 38 to the head end 36 of the liner segments 15.

As a result of the first and second liner segments 15A, 15B moving together, both inner surfaces 28 of the first and second liner segments 15A, 15B are moved to the relatively greater second radius $r_2$ from the central axis 20 providing for a smooth transition between the liner segments 15A, 15B as the blade 114 rotates around the central axis as shown in FIG. 8. In the illustrative embodiment, the first liner segment 15A deforms into a blade-retention cavity formed between the liner segments 15 and the annular outer shroud 12 to allow a front hook 50A of the annular outer shroud 12 to block the released blade 114 from exiting the front end 22 of the fan case 10 as shown in FIG. 6.

In the illustrative embodiment, the annular outer shroud 12 includes a number of liner mounts 50 that extend inward toward the central axis 20 as shown in FIG. 6. Fasteners extend through the liner 14 and the liner mounts 50 to couple the liner 14 to the annular outer shroud 12. In other embodiments, the liner 14 may be bonded to the annular outer shroud 12 by an adhesive or any other suitable alternatives.

In the illustrative embodiment, the liner mounts 50 include the front hook 50A adjacent to the front end 22 of the fan case 10, a back hook 50C adjacent to the back end 24 of the fan case 10, and an intermediate hook 50B located axially between the front and back hooks 50A, 50C as shown in FIG. 6. The liner 14 is spaced apart from the inner surface 28 of the annular outer shroud between the front and intermediate hooks 50A, 50B to form the blade-retention cavity 40. The liner 14 is arranged to deform into the blade-retention cavity 40 when contacted by a released blade to allow the front hook 50A to minimize exiting of the released blade 114 from the front end 22 of the fan case 10.

In the illustrative embodiment, each liner segment 15 is formed to include a number of bolt holes for receiving fasteners to couple the liner segment 15 to the liner mounts 50 of the annular outer shroud 12 as shown in FIG. 6. After the liner segment 15 is coupled to the annular outer shroud 12, the bolt holes may be filled with epoxy or any other suitable filler. Each liner segment 15 is coupled to the hooks 50A, 50B, 50C such that the liner segment 15 may be uncoupled from the annular outer shroud 12 by moving the liner segment 15 radially inward without moving the liner segment 15 axially relative to the annular outer shroud 12 as shown in FIG. 6.

A liner segment 15 may be removed from the fan case 10 when the gas turbine engine 100 is mounted to an aircraft. During removal, the liner segment 15 is uncoupled from the annular outer shroud 12. The liner segment 15 is moved radially inward along a path toward the central axis 20 without moving the liner segment 15 axially relative to the central axis 20. In some embodiments, the path is curved. In some embodiments, the gas turbine engine 100 further includes the fan rotor 116 extending along the central axis 20 and including the number of blades 114 coupled to the fan rotor 116. The fan blades 114 extend radially outward from the central axis 20 toward the liner segment 15. One or more of the blade 114 may be removed from the fan rotor 116 before moving the uncoupled liner segment 15.

In one illustrative example, each liner segment 15 includes an outer tray 30, an abraidable layer 32, and a liner-filler body 34 as shown in FIG. 6. The outer tray 30 couples the liner segment 15 to the annular outer shroud 12. The liner-filler body 34 reinforces the liner segment 15. The abraidable layer 32 confronts the fan blades 114 to provide an air flow path through the fan assembly 130. During typical use of the gas turbine engine 100, wear may occur to the abraidable layer 32 over time. As a result, the liner segment 15 may be replaced as part of routine or typical maintenance.

The outer tray 30 is coupled to the liner mounts 50 to couple the liner segment 15 to the annular outer shroud 12 as shown in FIG. 6. The liner segment 15 is coupled to the annular outer shroud 12 such that the blade-retention cavity 40 is formed between the outer tray 30 and the inner surface 28 of the annular outer shroud 12. The outer tray 30 is illustratively made of composite materials. In other embodiments, the outer tray is made from metal.

The liner-filler body 34 is positioned radially between the outer tray 30 and the abraidable layer 32 as shown in FIG. 6. In the illustrative embodiment, the liner-filler body 34 is bonded to the outer tray 30. In the illustrative embodiment, the liner-filler body 34 is a honeycomb made of aluminum.

The abraidable layer 32 is bonded to the liner-filler body 34 as shown in FIG. 6. During operation of the engine 100, one or more of the fan blades 114 may contact the abraidable layer 32 and cause portions of the abraidable layer 32 to separate from the liner segment 15 without harming the fan blades 114 or fan case 10 so that a dimensional tolerance between the fan blades 114 and the fan case 10 is achieved.

Another illustrative fan case 210 adapted for use in the gas turbine engine 100 is shown in FIG. 9. The fan case 210 is substantially similar to the fan case 10 shown in FIGS. 1-8 and described herein. Accordingly, similar reference numbers in the 200 series indicate features that are common between the fan case 10 and the fan case 210. The description of the fan case 10 is hereby incorporated by reference to apply to the fan case 210, except in instances when it conflicts with the specific description and drawings of the fan case 210.

The fan case 210 includes a liner 214 formed from a number of liner segments 215 as shown in FIG. 9. The head surface 246 and the tail surface 248 included in the liner segments 215 are curved. In the illustrative embodiment, the head surface 246 is curved such that it intersects a ray extending from the central axis 220 toward the annular outer shroud 212. The tail surface 248 is curved such that it intersects a ray extending from the central axis 220 toward the annular outer shroud 212. In the illustrative embodiment, the head surface 246 and the tail surface 248 have corresponding curves.

Another illustrative fan case 310 adapted for use in the gas turbine engine 100 is shown in FIG. 10. The fan case 310 is substantially similar to the fan case 10 shown in FIGS. 1-8 and described herein. Accordingly, similar reference numbers in the 300 series indicate features that are common between the fan case 10 and the fan case 310. The description of the fan case 10 is hereby incorporated by reference to apply to the fan case 310, except in instances when it conflicts with the specific description and drawings of the fan case 310.

The fan case 310 includes a liner 314 formed from a number of liner segments 315 as shown in FIG. 10. The head surface 346 includes a first sub-surface 370 extending from the inner radial surface 42 toward the outer radial surface 344 and a second sub-surface 372 extending from the outer radial surface 344 toward the inner radial surface 342 and connected to the first sub-surface 370. In the illustrative embodiment, the first sub-surface 370 and the second sub-surface 372 are linear.

A first ray 360 extends from the central axis 320 toward the outer radial surface 344 and intersects the first sub-surface 370 as shown in FIG. 10. An acute angle α is defined between the first sub-surface 370 and the first ray 360. The acute angle α is between about 10 degrees and about 30 degrees. In the illustrative embodiment, the acute angle α is about 20 degrees.

An acute angle β is defined between the second sub-surface 372 and the first ray 360 as shown in FIG. 10. The acute angle β is between about 10 degrees and about 30 degrees. In some embodiments, the acute angle β is about 20 degrees. In the illustrative embodiment, the acute angle β is different than the acute angle α.

The tail surface 348 includes a first sub-surface 374 extending from the inner radial surface 342 toward the outer radial surface 344 and a second sub-surface 376 extending from the outer radial surface 344 toward the inner radial surface 342 and connected to the first sub-surface 370 as shown in FIG. 10. The head surface 346 and the tail surface 348 have corresponding shapes.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case that extends around fan blades of a fan rotor included in a gas turbine engine, the fan case comprising
an annular outer shroud arranged to extend around a central axis of the fan case such that the annular outer shroud extends around the fan blades of the fan rotor, the annular outer shroud having an outer surface facing away from the central axis and an inner surface facing toward the central axis,
a first liner segment coupled to the inner surface of the annular outer shroud, the first liner segment including an inner radial surface, an outer radial surface spaced apart radially from the inner radial surface of the first liner segment, and a head surface extending between and interconnecting the inner and outer radial surfaces, wherein the head surface intersects a first ray extending from the central axis to the annular outer shroud, and
a second liner segment coupled to the inner surface of the annular outer shroud, the second liner segment including an inner radial surface, an outer radial surface spaced apart radially from the inner radial surface of the second liner segment, and a tail surface extending between and interconnecting the inner and outer radial surfaces, wherein the tail surface intersects the first ray and the head surface and the tail surface are aligned such that the head surface overlaps the tail surface when viewed radially inwardly along the first ray toward the central axis.

2. The fan case of claim 1, wherein the head surface is curved.

3. The fan case of claim 1, wherein the head surface is linear and an acute angle α is defined between the head surface and the first ray and the acute angle α is between 10 degrees and 30 degrees.

4. The fan case of claim 3, wherein the acute angle α is 20 degrees.

5. The fan case of claim 1, wherein the head surface includes a first sub-surface extending from the inner radial surface toward the outer radial surface and a second sub-surface extending from the outer radial surface toward the inner radial surface and connected to the first sub-surface.

6. The fan case of claim 5, wherein the first sub-surface is linear and an acute angle α is defined between the first sub-surface and the first ray and the acute angle α is between 10 degrees and 30 degrees.

7. The fan case of claim 6, wherein the acute angle α is 20 degrees.

8. The fan case of claim 6, wherein the second sub-surface included in the head surface is linear and an acute angle β is defined between the second sub-surface included in the head surface and the first ray, and the acute angle β is between 10 degrees and 30 degrees.

9. The fan case of claim 8, wherein the acute angle β is different than the acute angle α.

10. The fan case of claim 1, wherein the first liner segment includes an abradable inner radial layer that defines the inner radial surface, an outer radial layer that defines the outer radial surface, and a liner-filler body located radially between the inner radial layer and the outer radial layer of the first liner segment.

11. The fan case of claim 10, wherein the liner-filler body is honeycomb shaped.

12. A fan case that extends around fan blades of a fan rotor included in a gas turbine engine, the fan case comprising
an annular outer shroud arranged to extend around a central axis of the fan case such that the annular outer shroud extends around the fan blades of the fan rotor, the annular outer shroud having an outer surface facing away from the central axis and an inner surface facing toward the central axis,
a first liner segment having an outer radial surface coupled to the inner surface of the annular outer shroud and an inner radial surface radially spaced apart from the outer radial surface, the inner radial surface positioned at a first radius from the central axis, the first liner segment including a body, a head coupled to the body and extending toward a second liner segment, and a tail coupled to the body and extending away from the body, and a second liner segment having an outer radial surface coupled to the inner surface of the annular outer shroud and an inner radial surface radially spaced apart from the outer radial surface, the inner radial surface positioned at a first radius from the central axis, the second liner segment including a body, a tail coupled to the body and extending toward the first liner segment, and a head coupled to the body and extending away from the first liner segment, wherein the head of the first liner segment includes a head surface that intersects a first ray extending from the central axis to the annular outer shroud and the tail of the second liner segment includes a tail surface that intersects the first ray, wherein movement of the first liner segment in a radially outward direction causes the head of the first liner segment to engage the tail of the second liner segment and to move therewith to cause the inner surface of the first liner segment to be positioned at a second radius from the central axis and the inner surface of the second liner segment to be positioned at the second radius from the central axis.

13. The fan case of claim 12, wherein a first acute angle α is defined between the head surface and the first ray and the first acute angle α0 is between 10 degrees and 30 degrees.

14. The fan case of claim 13, wherein the first acute angle α is 20 degrees.

15. The fan case of claim 14, wherein a second acute angle θ is defined between the tail surface and the second ray and the second acute angle θ is between 10 degrees and 30 degrees.

16. The fan case of claim 15, wherein the second acute angle θ is 20 degrees.

17. The fan case of claim 12, wherein the first liner segment includes an abradable inner radial layer that defines the inner radial surface, an outer radial layer that defines the outer radial surface, and a liner-filler body located radially between the inner radial layer and the outer radial layer of the first liner segment.

18. A method of removing a liner segment from a fan case included in a gas turbine engine mounted to an aircraft, the method comprising the steps of providing a gas turbine engine mounted to an aircraft, the gas turbine engine including a plurality of fan blades and a fan case that extends circumferentially around a central axis and the plurality of fan blades and the fan case including an annular outer shroud, a first liner segment coupled to the annular outer shroud to lie between the annular outer shroud and the central axis, and a second liner segment coupled to the annular outer shroud to lie between the annular outer shroud and the central axis, wherein the first liner segment includes an inner radial surface, an outer radial surface spaced apart radially from the inner radial surface of the first liner segment, and a head surface extending between and interconnecting the inner and outer radial surfaces, wherein the head surface intersects a first ray extending from the central axis to the annular outer shroud, the second liner segment includes an inner radial surface, an outer radial surface spaced apart radially from the inner radial surface of the second liner segment, and a tail surface extending between and interconnecting the inner and outer radial surfaces, the tail surface intersects the first ray, and the head surface and the tail surface are aligned such that the head surface overlaps the tail surface when viewed radially inwardly along the first ray toward the central axis, uncoupling the first liner segment from the annular outer shroud, and moving the first liner segment radially inward along a path toward the central axis without moving the first liner segment axially relative to the central axis.

19. The method of claim 18, wherein the path is curved.

20. The method of claim 18, wherein the fan blades rotate in a direction of travel from the tail to the head of the first liner segment.

* * * * *